(12) United States Patent
Angaiah et al.

(10) Patent No.: US 6,656,441 B2
(45) Date of Patent: Dec. 2, 2003

(54) PROCESS FOR THE PREPARATION OF LITHIUM METAPHOSPHATE

(75) Inventors: Subramanian Angaiah, Karaikudi (IN); Vasudevan Thiagarajan, Karaikudi (IN); Gnagadharan Ramaiyer, Karaikudi (IN); Raghavan Meenakshisundaram, Karaikudi (IN)

(73) Assignee: Council of Scientific & Industrial Research, New Delhi (IN)

( * ) Notice: Subject to any disclaimer, the term of this patent is extended or adjusted under 35 U.S.C. 154(b) by 33 days.

(21) Appl. No.: 10/108,556

(22) Filed: Mar. 29, 2002

(65) Prior Publication Data

US 2003/0185737 A1 Oct. 2, 2003

(51) Int. Cl.[7] ............................................. C01B 25/30
(52) U.S. Cl. ....................................................... 423/314
(58) Field of Search .................................. 423/312, 314

(56) References Cited

U.S. PATENT DOCUMENTS 3,314,750 A    4/1967   Chung

FOREIGN PATENT DOCUMENTS

EP    0 306 205 A1    3/1989
GB       1012410 A   12/1965

OTHER PUBLICATIONS

R.C. Mehrotra and C.K. Oza: "Studies In Condensed Phosphates: Part IX–Complex Lithium Polymethaphosphate Derivatives Of Some Bivalent Metal Ions", Indian Journal of Chemistry, vol. 6, Mar. 1968, pp. 158–160, XP–008011283.

Mehrotra, R.C. et al: "Complex Polymetaphosphates of Strongly Electropositive Elements", Journal of the Indian Chemical Society, vol. 59, No. 4, Apr. 1982, pp. 486–492, XP–008011302.

Fokina, M.F. et al, Database Abstract Online: "Lithium metaphosphate", database accession No. 78:143256 CA, XP–002222967.

*Primary Examiner*—Stanley S. Silverman
*Assistant Examiner*—Maribel Medina
(74) *Attorney, Agent, or Firm*—Sughrue Mion, PLLC

(57) ABSTRACT

The present invention provides a process for the preparation of lithium metaphosphate comprising reacting a lithium source and a phosphorous source in solid state to obtain lithium metaphosphate.

9 Claims, 1 Drawing Sheet

PROCESS FOR THE PREPARATION OF LITHIUM METAPHOSPHATE

FIELD OF THE INVENTION

Figure 1:
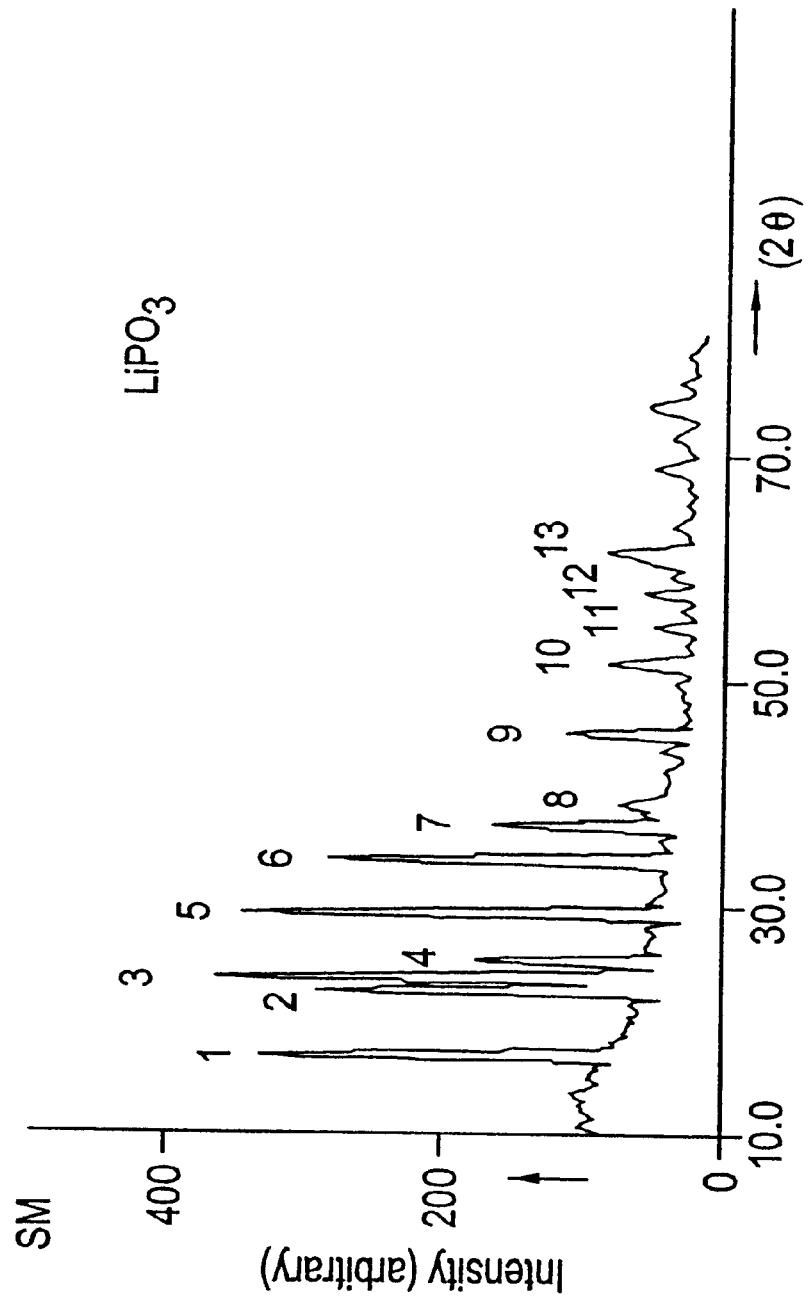

The present invention relates to a novel process for the preparation of lithium metaphosphate ($LiPO_3$) by a solid state thermal reaction. This compound is useful as an intermediate for the preparation of lithium hexa fluorophosphates ($LiPF_6$). This salt is a good electrolyte in aqueous, non-aqueous, solid and selected polymer medium. The present invention particularly relates to the preparation of lithium metaphosphate ($LiPO_3$) compound which is the basic chemical for the preparation of lithium hexafluorophosphates ($LiPF_6$) by a novel solid state method which is not hitherto attempted anywhere.

BACKGROUND OF THE INVENTION

Prior art literature on lithium metaphosphate ($LiPO_3$) discloses the reaction of lithium salts with metaphosphoric acid, which is obtained by heating pyro-phosphoric acid or ortho-phosphoric acid. The reaction occurring for the above two thermal processes are as follows:

| 1. | $H_4P_2O_7$ | → | $2HPO_3 + H_2O$ |
|---|---|---|---|
| 2. | $H_3PO_3$ | → | $HPO_3 + H_2O$ |
|    | $HPO_3 + LiOH$ | → | $LiPO_3 + H_2O$ |

REFERENCE

Advanced Inorganic Chemistry, S. Sathiya Prakash G. D. Tuli, S. K. Basu and R. D. Radan, S. Chand & Co., New Delhi, p. 988 (1998).

The above methods need controlled conditions for the preparation of lithium metaphosphate. The above methods for the preparation of lithium metaphosphate also suffer from the following disadvantages:

1. More than one step is involved to prepare $LiPO_3$.
2. Needs crystallization procedure once the product is formed from aqueous solution.

OBJECTS OF THE INVENTION

The main object of this present invention is to provide a simple novel process for the synthesis of lithium meta phosphate ($LiPO_3$) which obviates the draw back mentioned above.

Another object of the present invention is to provide a complete solid state reaction procedure for the preparation of $LiPO_3$.

Another object of the invention is to provide a single step process to obtain $LiPO_3$.

Yet another object of the invention is to get high yield of the product $LiPO_3$ (>90%).

SUMMARY OF THE INVENTION

The above and other objects have been achieved by the solid state method for the preparation of lithium metaphosphate of the invention.

Accordingly, the present invention provides a process for the preparation of lithium metaphosphate comprising reacting a lithium source and a phosphorous source in a ratio of 1:1–2 in solid state at a temperature in the range of 300 to 650° C. to obtain the desired lithium metaphosphate.

In one embodiment of the invention, the lithium source is selected from the group consisting of $Li_2O$, $LiCO_3$, $LiOH$, $LiNO_3$ and any mixture thereof.

In another embodiment of the invention, the phosphorous source is selected from the group consisting of ammonium pyrophosphate, ammonium orthophosphate, diammonium hydrogen phosphate and ammonium dihydrogen phosphate and any mixture thereof.

In another embodiment of the invention, the reaction is carried out in solid state in a single step.

In yet another embodiment of the invention, the reaction is carried out at a temperature of 350° C. for a time period of 12 hours and the lithium source is selected from $Li_2O$, $LiOH$ and $LiNO_3$.

In another embodiment of the invention, the reactive materials are heated in a muffle or in an electric furnace.

In yet another embodiment of the invention, $Li_2CO_3$ is reacted with the phosphorous source at a temperature of 600° C.

In another embodiment the lithium source and the phosphorous source are mixed and ground well before being heated.

In another embodiment of the invention, the lithium source and the phosphorous source are mixed in an equimolar ratio.

BRIEF DESCRIPTION OF THE ACCOMPANYING DRAWING

The FIGURE shows the X-ray analysis of the product obtained by the process of the present invention.

DETAILED DESCRIPTION OF THE INVENTION

Preferably equimolar quantities of ammonium pyrophosphate/ammonium orthophosphate/ diammonium hydrogen phosphate/ammonium dihydrogen phosphate is allowed to react with $Li_2O/LiCO_3/LiOH/LiNO_3$ at a temperature of 350° C. in a muffle furnace for a period of 12 hours to get lithium meta phosphate ($LiPO_3$) which was confirmed by X-ray analysis. The reaction occurring with lithium salts and ammonium salts of pyro and ortho phosphates are as follows:

| 1. | $(NH_4)_4P_2O_7 + 2LiOH$ | → | $2LiPO_3 + 4NH_3 + 3H_2O$ |
|---|---|---|---|
| 2. | $(NH_4)_3PO_4 + LiOH$ | → | $LiPO_3 + 3NH_3 + 2H_2O$ |
| 3. | $(NH_4)_2HPO_4 + LiOH$ | → | $LiPO_3 + 2NH_3 + 2H_2O$ |
| 4. | $(NH_4)H_2PO_4 + LiOH$ | → | $LiPO_3 + NH_3 + 2H_2O$ |

A novel method for the preparation of $LiPO_3$ is developed wherein equimolar quantities of $LiOH/Li_2CO_3/Li_2O/LiNO_3$. This mixture is ground well and then transferred into a porcelain/silica crucible. In the mixture, the lithium salt content to the phosphorous content should be in the molar ratio of 1:1. The silica crucible containing the mixture is introduced into an electric furnace. The furnace was slowly heated to 350° C. and the heating was continued for 12 hours keeping the same temperature. When the reaction is over, the furnace was cooled and the product was ground well and then examined for its purity and identity.

In the process of the invention for the synthesis of lithium meta phosphate lithium salt ($LiOH/Li_2CO_3/Li_2O/LiNO_3$) is mixed with equimolar quantities of ammonium pyrophosphate or ammonium orthophosphae or diammonium hydrogen phosphate or ammonium dihydrogen phosphate and the mixture is ground well and then transferred the mixture into a silica crucible and then the crucible containing the mixture is heated to 350° C. continuously in an electric furnace to get $LiPO_3$. The reactants are solid state materials and are heated in a muffle or in an electric furnace. Pure dry AR $Li_2O$ or $Li_2CO_3$ or LiOH or $LiNO_3$ was mixed with any one of the salts of ammonium pyrophosphate or ammonium orthophosphate or diammonium hydrogen phosphate or ammonium dihydrogen phosphate in equilmolar quantities. The Li and P content of the salt was kept in the ratio 1:1. The mixture of the lithium and the phosphate salts are ground well and then the grounded mixture was transferred into silica vessel. The vessel was then introduced into a electric furnace. The furnace was slowly heated to 350° C. continuously for 12 hours and then the resultant product was powdered well and then analyzed for its purity and identity.

The following examples are given by way illustration and therefore should not be construed to limit the scope of the prevent invention.

EXAMPLE 1

A mixture of dry AR $Li_2CO_3$ and dry AR $(NH_4)_4P_2O_7$ was taken in 1:2 molar ratio. The mixture was ground well so as to get particle size in the range of 5–10 $\mu$m. The above mixture was taken in a silica/porcelain crucible and was then introduced in a muffle/electric furnace. The mixture was initially heated slowly and finally to 600° C. for 12 hours continuously. The resultant product is $LiPO_3$.

| Components | Composition |
| --- | --- |
| $Li_2CO_3$ | 0.74 g |
| $(NH_4)_4P_2O_7$ | 4.72 g |
| Initial Temperature | 100° C. |
| Time | 1 hour |
| Final Temperature | 600° C. |
| Time | 12 hours |
| Nature of the product | Transparent |
| Efficiency of the process | >90% |
| Particle size of the mixture | 5–10 m$\mu$. |

EXAMPLE 2

A mixture of dry AR $Li_2CO_3$ and dry AR $(NH_4)_3PO_4$ was taken in equimolar ratio. The mixture was ground well so as to get particle size in the range of 5–10 $\mu$m. The above mixture was taken in a silica/porcelain crucible and was then introduced in a muffle/electric furnace. The mixture was initially heated slowly and finally to 600° C. for 12 hours continuously. The resultant product is $LiPO_3$. Particle size of the mixture 5–10 m$\mu$.

| Components | Composition |
| --- | --- |
| $Li_2CO_3$ | 0.74 g |
| $(NH_4)_3PO_4$ | 1.67 g |
| Temperature | 600° C. |
| Time | 12 hours |
| Nature of the product | Transparent |
| Efficiency of the process | >90% |
| Particle size of the mixture | 5–10 m$\mu$. |

EXAMPLE 3

A mixture of dry AR $Li_2CO_3$ and dry AR $(NH_4)_2HPO_4$ was taken in equimolar ratio. The mixture was ground well so as to get particle size in the range of 5–10 $\mu$m. The above mixture was taken in a silica/porcelain crucible and was then introduced in a muffle/electric furnace. The mixture was initially heated slowly and finally to 600° C. for 12 hours continuously. The resultant product is $LiPO_3$.

| Components | Composition |
| --- | --- |
| $Li_2CO_3$ | 0.74 g |
| $(NH_4)_2HPO_4$ | 1.15 g |
| Initial Temperature | 100° C. |
| Time | 1 Hour |
| Final Temperature | 600° C. |
| Time | 12 hours |
| Nature of the product | Transparent |
| Efficiency of the process | >91% |
| Particle size of the mixture | 5–10 m$\mu$. |

EXAMPLE 4

A mixture of dry AR $Li_2CO_3$ and dry AR $(NH_4)HPO_4$ was taken in equimolar ratio. The mixture was ground well so as to get particle size in the range of 5–10 $\mu$m. The above mixture was taken in a silica/porcelain crucible and was then introduced in a muffle/electric furnace. The mixture was heated initially slowly and finally to 600° C. for 12 hours continuously. The resultant product is $LiPO_3$.

| Components | Composition |
| --- | --- |
| $Li_2CO_3$ | 0.74 g |
| $(NH_4)HPO_4$ | 1.32 g |
| Initial Temperature | 100° C. |
| Final Temperature | 600° C. |
| Time | 12 hours. |
| Nature of the product | Transparent |
| Efficiency of the process | >90% |
| Particle size of the mixture | 5–10 m$\mu$. |

EXAMPLE 5

A mixture of dry AR LiOH and dry AR $(NH_4)_4P_2O_7$ was taken in 1:2 molar ratio. The mixture was ground well so as to get particle size in the range of 5–10 $\mu$m. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| LiOH | 0.74 g |
| $(NH_4)_4P_2O_7$ | 4.72 g |
| Initial Temperature | 100° C. |
| Time | 1 Hour |
| Final Temperature | 600° C. |
| Time | 12 hours |
| Nature of the product | Transparent |
| Efficiency of the process | >90% |
| Particle size of the mixture | 5–10 m$\mu$. |

EXAMPLE 6

A mixture of dry AR LiOH and dry AR $(NH_4)_3PO_4$ was taken in equimolar ratio. The mixture was ground well so as to get particle size in the range of 5–10 $\mu$m. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| LiOH | 0.74 g |
| $(NH_4)_2HPO_4$ | 1.15 g |
| Temperature | 350° C. |
| Time | 12 hours |
| Nature of the product | Transparent |
| Efficiency of the process | >90% |
| Particle size of the mixture | 5–10 mμ. |

EXAMPLE 7

A mixture of dry AR LiOH and dry AR $(NH_4)_2HPO_4$ was taken in equimolar ratio. The mixture was ground well so as to get particle size in the range of 5–10 μm. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| LiOH | 0.24 g |
| $(NH_4)_2HPO_4$ | 1.32 g |
| Initial Temperature | 100° C. |
| Time | 1 hour |
| Final Temperature | 600° C. |
| Time | 12 hours |
| Nature of the product | Transparent |
| Efficiency of the process | >90% |
| Particle size of the mixture | 5–10 mμ. |

EXAMPLE 8

A mixture of dry AR LiOH and dry AR $(NH_4)_4P_2O_7$ was taken in equimolar ratio. The mixture was ground well so as to get particle size in the range of 5–10 μm. The above mixture was taken in a silica/porcelain crucible and was then introduced in a muffle/electric furnace. The mixture was heated initially slowly and finally to 350° C. for 12 hours continuously. The resultant product is $LiPO_3$.

| Components | Composition |
| --- | --- |
| LiOH | 0.24 g |
| $(NH_4)_4P_2O_7$ | 4.92 g |
| Initial Temperature | 100° C. |
| Time | 1 hour |
| Final temperature | 600° C. |
| Time | 12 hours |
| Nature of product | Transparent |
| Efficiency of the process | >90% |
| Particle size of the mixture | 5–10 mμ. |

EXAMPLE 9

A mixture of dry AR $LiNO_3$ and dry AR $(NH_4)_4P_2O_7$ was taken in 1:2 molar ratio. The mixture was ground well so as to get particle size in the range of 5–10 μm. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| $LiNO_3$ | 0.69 g |
| $(NH_4)_4P_2O_7$ | 4.92 g |
| Initial Temperature | 100° C. |
| Time | 1 hour |
| Final Temperature | 600° C. |
| Time | 12 hours |
| Nature of the product | Transparent |
| Efficiency of the process | >91% |
| Particle size of the mixture | 5–10 mμ. |

EXAMPLE 10

A mixture of dry AR $LiNO_3$ and dry AR $(NH_4)_2HPO_4$ was taken in equimolar ratio. The mixture was ground well so as to get particle size in the range of 5–10 μm. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| $LiNO_3$ | 0.69 g |
| $(NH_4)_2HPO_4$ | 1.32 g |
| Initial Temperature | 100° C. |
| Time | 1 hour |
| Final Temperature | 600° C. |
| Time | 12 hours |
| Nature of the product | Transparent |
| Efficiency of the process | >90% |
| Particle size of the mixture | 5–10 mμ. |

EXAMPLE 11

A mixture of dry AR $LiNO_3$ and dry AR $(NH_4)HPO_4$ was taken in equimolar ratio. The mixture was ground well so as to get particle size in the range of 5–10 μm. The above mixture was taken in a silica/porcelain crucible and was then introduced in a muffle/electric furnace. The mixture was heated initially slowly and finally to 350° C. for 12 hours continuously. The resultant product is $LiPO_3$.

| Components | Composition |
| --- | --- |
| $LiNO_3$ | 0.69 g |
| $(NH_4)HPO_4$ | 1.15 g |
| Initial Temperature | 100° C. |
| Time | 1 hour |
| Final Temperature | 600° C. |
| Time | 12 hours |
| Nature of the product | Transparent |
| Efficiency of the process | >90% |
| Particle size of the mixture | 5–10 mμ. |

EXAMPLE 12

A mixture of dry AR $Li_2O$ and dry AR $(NH_4)_4P_2O_7$ was taken 1:2 molar ratio. The mixture was ground well so as to get particle size in the range of 5–10 μm. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| $Li_2O$ | 0.30 g |
| $(NH_4)_2P_2O_7$ | 4.92 g |
| Initial Temperature | 100° C. |
| Time | 1 hour |
| Final Temperature | 600° C. |
| Time | 12 hours |
| Nature of the product | Transparent |
| Efficiency of the process | >91% |
| Particle size of the mixture | 5–10 mμ. |

EXAMPLE 13

A mixture of dry AR $Li_2O$ and dry AR $(NH_4)_2HPO_4$ was taken in equimolar ratio. The mixture was ground well as to get particle size in the range of 5–10 μm. The above mixture was taken in a silica/porcelain crucible and was then introduced in a muffle/electric furnace. The mixture was initially heated slowly and finally to 350° C. for 12 hours continuously. The resultant product is $LiPO_3$.

| Components | Composition |
| --- | --- |
| $Li_2O$ | 0.30 g |
| $(NH_4)_2HPO_4$ | 1.32 g |
| Initial Temperature | 100° C. |
| Time | 1 hour |
| Final Temperature | 600° C. |
| Time | 12 hours |
| Nature of the product | Transparent |
| Efficiency of the process | >90% |
| Particle size of the mixture | 5–10 mμ. |

EXAMPLE 14

A mixture of dry AR $Li_2O$ and dry AR $(NH_4)HPO_4$ was taken in equimolar ratio. The mixture was ground well so as to get particle size in the range of 5–10 μm. The above mixture was taken in a silica/porcelain crucible and was then introduced in a muffle/electric furnace. The mixture was heated initially slowly and finally to 350° C. for 12 hours continuously. The resultant product is $LiPO_3$.

| Components | Composition |
| --- | --- |
| $Li_2O$ | 0.30 g |
| $(NH_4)HPO_4$ | 1.15 g |
| Initial Temperature | 100° C. |
| Time | 1 Hour |
| Final Temperature | 600° C. |
| Time | 12 hours |
| Nature of the product | Transparent |
| Efficiency of the process | >91% |
| Particle size of the mixture | 5–10 mμ. |

CONCLUSIONS

Ammonium pyrophosphate or ammonium orthophosphate or diammonium hydrogen phosphate or ammonium dihydrogen phosphate reacts with Li salts like $LiOH/Li_2O/Li_2CO_3/LiNO_3$ such that Li salt and P salt mixture combinations are in equimolar proportion (1:1) to form $LiPO_3$, when the temperature of heating is maintained at about 350° C. for 12 hrs continuously. In the absence of $Li_2CO_3$ in any of the above reaction mixture with ammonium pyrophosphate or ammonium orthophosphate or diammonium hydrogen phosphate or ammonium dihydrogen phosphate the temperature is 350° C. The colour of the product is white and the particle size can be brought to any decided level. X-ray analysis confirms the $LiPO_3$ formation.

The main advantages of the present invention are:

1. It is a single step, thermal procedure for the preparation of $LiPO_3$
2. It is a solid state thermal procedure.
3. Any of the lithium salts like $LiOH/Li_2CO_3/Li_2O/LiNO_3$ is mixed with ammonium pyrophosphate or ammonium orthophosphate or diammonium hydrogen phosphate or ammonium dihydrogen phosphate to give $LiPO_3$.
4. This is a base material for the preparation of $LiPF_6$.

We claim:

1. A process for the preparation of lithium metaphosphate comprising reacting a lithium source and a phosphorous source in a ratio of 1:1–2 in solid state at a temperature in the range of 300 to 650° C. to obtain the desired lithium metaphosphate.

2. A process as claimed in claim 1 wherein the lithium source is selected from the group consisting of $Li_2O$, $LiCO_3$, LiOH, $LiNO_3$ and any mixture thereof.

3. A process as claimed in claim 1 wherein the phosphorous source is selected from the group consisting of ammonium pyrophosphate, ammonium orthophosphate, diammonium hydrogen phosphate, ammonium dihydrogen phosphate and any mixture thereof.

4. A process as claimed in claim 1 wherein the reaction is carried out in solid state in a single step.

5. A process as claimed in claim 1 wherein the reaction is carried out at a temperature of 350° C. for a time period of 12 hours and the lithium source is selected from the group consisting of $Li_2O$, LiOH and $LiNO_3$.

6. A process as claimed in claim 1 wherein the reactive materials are heated in a muffle or in an electric furnace.

7. A process as claimed in claim 1 wherein $Li_2CO_3$ is reacted with the phosphorous source at a temperature of 600° C.

8. A process as claimed in claim 1 wherein the lithium source and the phosphorous source are mixed and ground well before being heated.

9. A process as claimed in claim 1 wherein the lithium source and the phosphorous source are mixed in an equimolar ratio.

* * * * *